(12) United States Patent
Kanehisa et al.

(10) Patent No.: US 7,191,884 B2
(45) Date of Patent: Mar. 20, 2007

(54) BICYCLE HUB

(75) Inventors: Takanori Kanehisa, Sakai (JP); Tomohiko Sato, Kawachinagano (JP)

(73) Assignee: Shimano Inc., Osaka (JP)

( * ) Notice: Subject to any disclaimer, the term of this patent is extended or adjusted under 35 U.S.C. 154(b) by 257 days.

(21) Appl. No.: 11/066,279

(22) Filed: Feb. 28, 2005

(65) Prior Publication Data

US 2006/0191764 A1   Aug. 31, 2006

(51) Int. Cl.
  *B60B 27/02* (2006.01)
(52) U.S. Cl. ..................... 192/64; 192/110 B
(58) Field of Classification Search ............ None
  See application file for complete search history.

(56) References Cited

U.S. PATENT DOCUMENTS

| | | | |
|---|---|---|---|
| 4,567,973 A | | 2/1986 | Butz |
| 5,632,364 A | | 5/1997 | Mercat |
| 5,738,197 A | * | 4/1998 | Kroger et al. ............. 192/64 |
| 6,065,580 A | * | 5/2000 | Kirk .................... 192/217.3 |
| 6,202,813 B1 | * | 3/2001 | Yahata et al. ............. 192/64 |
| 6,488,603 B2 | | 12/2002 | Lim et al. |
| 6,588,564 B1 | * | 7/2003 | Jager et al. ............... 192/64 |
| 6,827,497 B2 | * | 12/2004 | Chen ....................... 384/545 |
| 2004/0251736 A1 | | 12/2004 | Mercat et al. |
| 2005/0184580 A1 | * | 8/2005 | Kuan et al. ............. 301/110.5 |

* cited by examiner

*Primary Examiner*—Saul Rodriguez
(74) *Attorney, Agent, or Firm*—Global IP Counselors, LLP

(57) ABSTRACT

A bicycle hub is provided with a hub axle, a hub shell, a freewheel, a first hub axle ball bearing and a second hub axle ball bearing. The freewheel is operatively mounted between the hub axle and the hub shell. The freewheel includes a driven member, a drive body, an inner freewheel ball bearing and an outer freewheel slide bearing. The driven member is fixed to the hub shell to rotate therewith, while the drive body is operatively coupled to the driven member by a one-way clutch mechanism. The inner freewheel ball bearing is disposed between the driven member and the drive body to rotatably support an inner end of the drive body on the driven member. The outer freewheel slide bearing is disposed between the driven member and the drive body to rotatably support an outer end of the drive body on the driven member.

15 Claims, 5 Drawing Sheets

BICYCLE HUB

BACKGROUND OF THE INVENTION

1. Field of the Invention

The present invention generally relates to a rear bicycle hub. More specifically, the present invention relates to a rear bicycle hub that has a sprocket mounting portion with a freewheel body coupled to the hub shell by a one-way clutch.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One of the most important aspects of a bicycle is how well the wheels rotate relative to the bicycle frame.

Basically, the wheels of a bicycle usually include a rim with a tire coupled to a hub by a plurality of spokes. The hub has a hub shell rotatably supported on an axle by a pair of bearing assemblies. Thus, the axle is fixed to the bicycle frame and a hub shell that is rotatably supported on the axle. The spokes are coupled between the hub shell and the rim. Typically, the rim is linked to the hub shell by spoke nipples that thread onto the radially outward ends of the spokes. However, recently, some bicycle wheel designs have reversed the spoke arrangement so that each of the spokes has an outer portion secured to the rim and a threaded end secured to the hub shell. The inner end can be secured to the hub shell via conventional spoke nipples. The conventional spoke nipples typically include a head portion and an internally threaded shaft portion. In the case of a rear hub, a freewheel is often used for selectively coupling the drive train to the hub shell. The freewheel typically has a freewheel body that supports a plurality of sprockets and a one-way clutch that selectively couples freewheel body to the hub shell. Thus, the freewheel allows the hub shell and the rim to freely rotate relative to the hub axle when the rider has stopped pedaling such that the rear sprockets remain stationary while the hub shell and the rim to freely rotate relative to the hub axle. When the rider is pedaling, the freewheel transfers rotation of the rear sprockets to the hub shell and the rim.

Clearly, the performance of the rear wheel has a major affect on the performance of a bicycle. Thus, it is important to construct wheels that are inexpensive and easy to assembly, while maintaining good performance. Moreover, it is preferably to design the rear hub with a freewheel body that uses standardized splines that are commonly used in the bicycle field. Thus, the hubs of the bicycle wheel have been substantially redesigned over the years for various reasons.

In view of the above, it will be apparent to those skilled in the art from this disclosure that there exists a need for a bicycle hub. This invention addresses this need in the art as well as other needs, which will become apparent to those skilled in the art from this disclosure.

SUMMARY OF THE INVENTION

One object of the present invention is to provide a more rigid bicycle hub in which the outer diameter of the freewheel remains the same, while the diameter of the hub axle is larger.

Another object is to provide a bicycle hub that is relatively lightweight compared to its rigidly and that is relatively easy to assemble.

Another object is to provide a bicycle hub which uses a standard freewheel body.

Another object is to provide a high quality bicycle hub that is relatively easy to produce at a reasonable price.

One aspect of the present invention can basically be attained by providing a bicycle hub that comprises a hub axle, a hub shell, a freewheel, a first hub axle ball bearing and a second hub axle ball bearing. The hub axle includes a first axle end and a second axle end. The hub shell has a first shell end and a second shell end with an inner tubular surface forming a central passage extending between the first and second shell ends. The hub axle is disposed within the central passage of the hub shell such that the hub shell is rotatably supported on the hub axle. The freewheel is operatively mounted between the second axle end of the hub axle and the second shell end of the hub shell. The freewheel includes a driven member, a drive body, an inner freewheel ball bearing and an outer freewheel slide bearing. The driven member is fixed to the second shell end of the hub shell to rotate therewith. The drive body is operatively coupled to the driven member by a one-way clutch mechanism. The inner freewheel ball bearing is disposed between the driven member and the drive body to rotatably support an inner end of the drive body on the driven member. The outer freewheel slide bearing is disposed between the driven member and the drive body to rotatably support an outer end of the drive body on the driven member. The first hub axle ball bearing is disposed between the first axle end of the hub axle and the first shell end of the hub shell to rotatably support the first shell end of the hub shell on the first axle end of the hub axle. The second hub axle ball bearing is disposed between the second axle end of the hub axle and one of the driven member and the second shell end of the hub shell to rotatably support the driven member and the second shell end of the hub shell on the second axle end of the hub axle.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
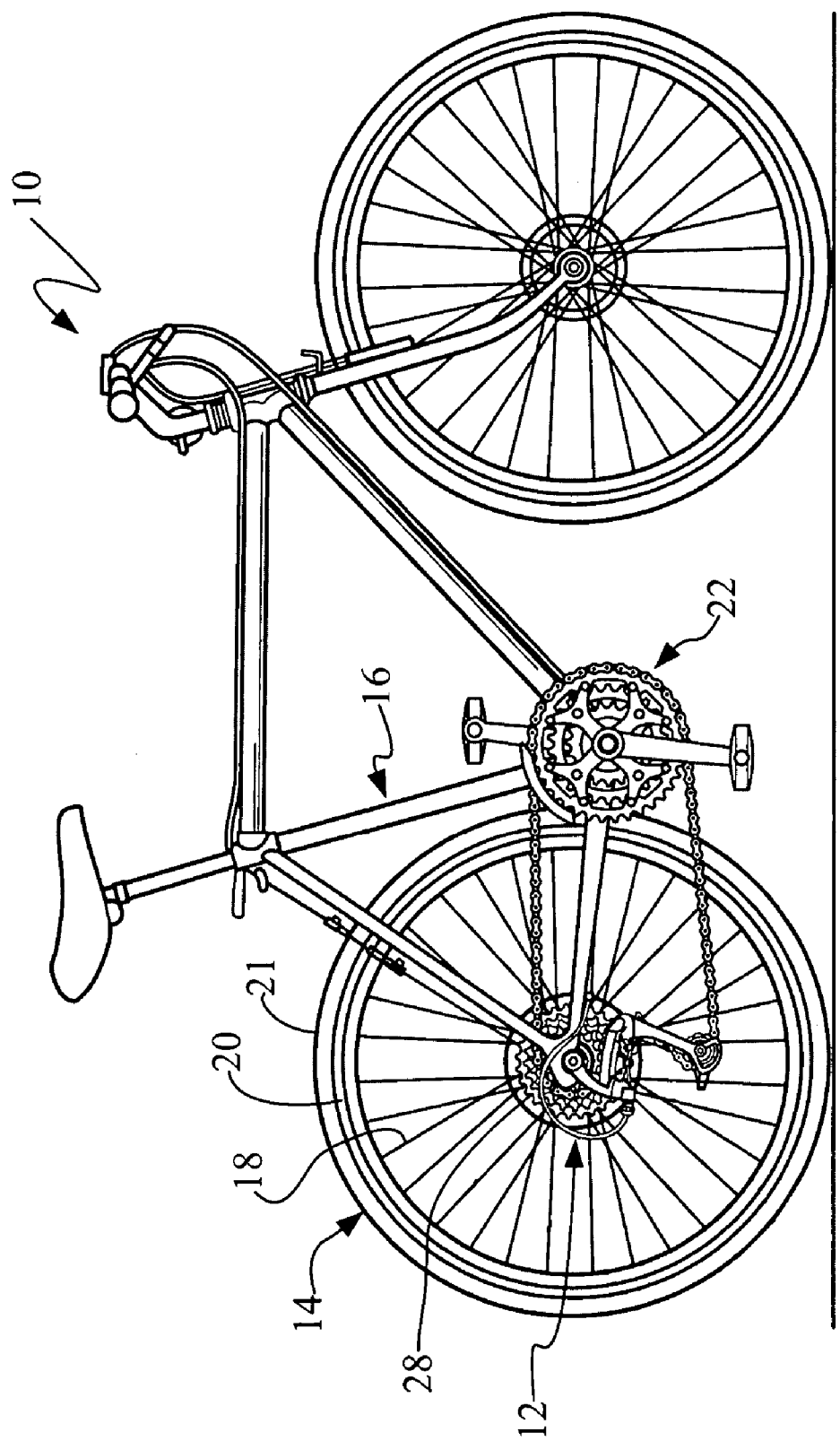
FIG. 1 is a side elevational view of a conventional bicycle with a rear bicycle hub in accordance with a preferred embodiment of the present invention.

Referring initially to FIG. 1, a bicycle 10 is illustrated with a rear bicycle hub 12 in accordance with a first embodiment of the present invention. The rear bicycle hub 12 is part of a rear wheel 14. The rear bicycle hub 12 is coupled to a rear portion of a bicycle frame 16. In particular, the rear wheel 14 have a plurality of spokes 18 extending outwardly the rear bicycle hub 12 that are coupled to a rear annular rim 20. The spokes 18 are coupled to the rim 20 by spoke nipples (not shown) such that the tension in the spokes 18 can be adjusted in a conventional manner. A pneumatic tire 21 is mounted on the outer surface of the rim 20. The bicycle 10 also includes a drive train 22 for propelling the bicycle 10 in a conventional manner. In the illustrated embodiment, the rear wheel 14 has thirty-two spokes. Of course, it will be apparent to those skilled in the art from this disclosure that the rear wheel 14 can have fewer or more of the spokes than illustrated, if needed and/or desired. Each of the spokes 18 has an outer threaded end or spoke head coupled to the rim 20 by a spoke nipple and an inner bent end coupled to the rear hub 12 in a conventional manner. Thus, the outer ends of the spokes 18 are threadedly coupled to the spoke nipples to adjust the tension in the spokes 18.

Moreover, since most of the parts of the bicycle 10 are well known in the art, the parts of the bicycle 10 will not be discussed or illustrated in detail herein, except for the parts relating to the rear hub 12 of the present invention. Moreover, various conventional bicycle parts such as brakes, derailleurs, additional sprocket, etc., which are not illustrated and/or discussed in detail herein, can also be used in conjunction with the present invention. In the illustrated embodiment, the rear hub 12 has a plurality rear sprockets 28 mounted thereon in a conventional manner. Of course, it will be apparent to those skilled in the art from this disclosure that the rear hub 12 can have fewer or more of the sprockets 28 than illustrated, if needed and/or desired.

Figure 2:
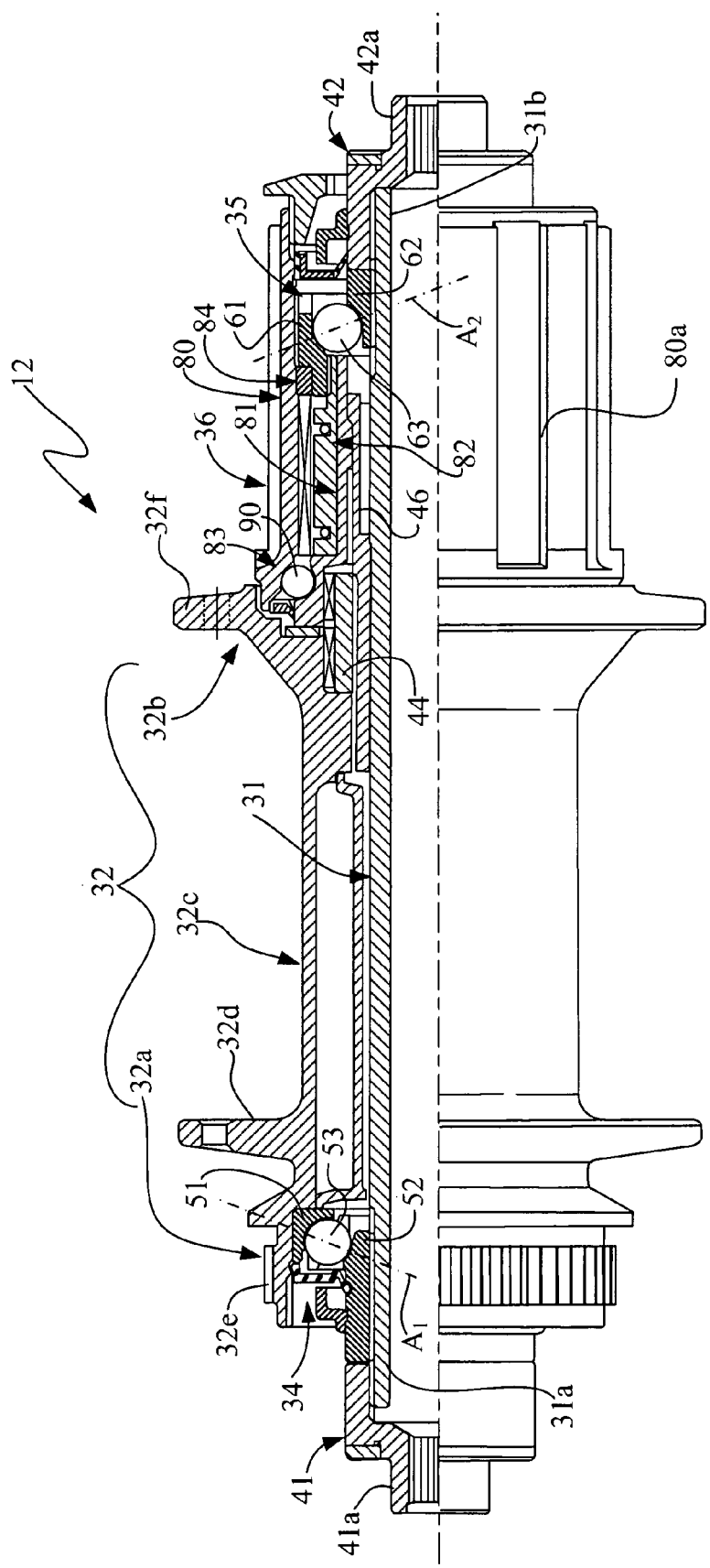
FIG. 2 is an elevational view of the rear bicycle hub illustrated in FIG. 1, with the top half shown in cross-section, in accordance with the preferred embodiment of the present invention.
Figure 3:
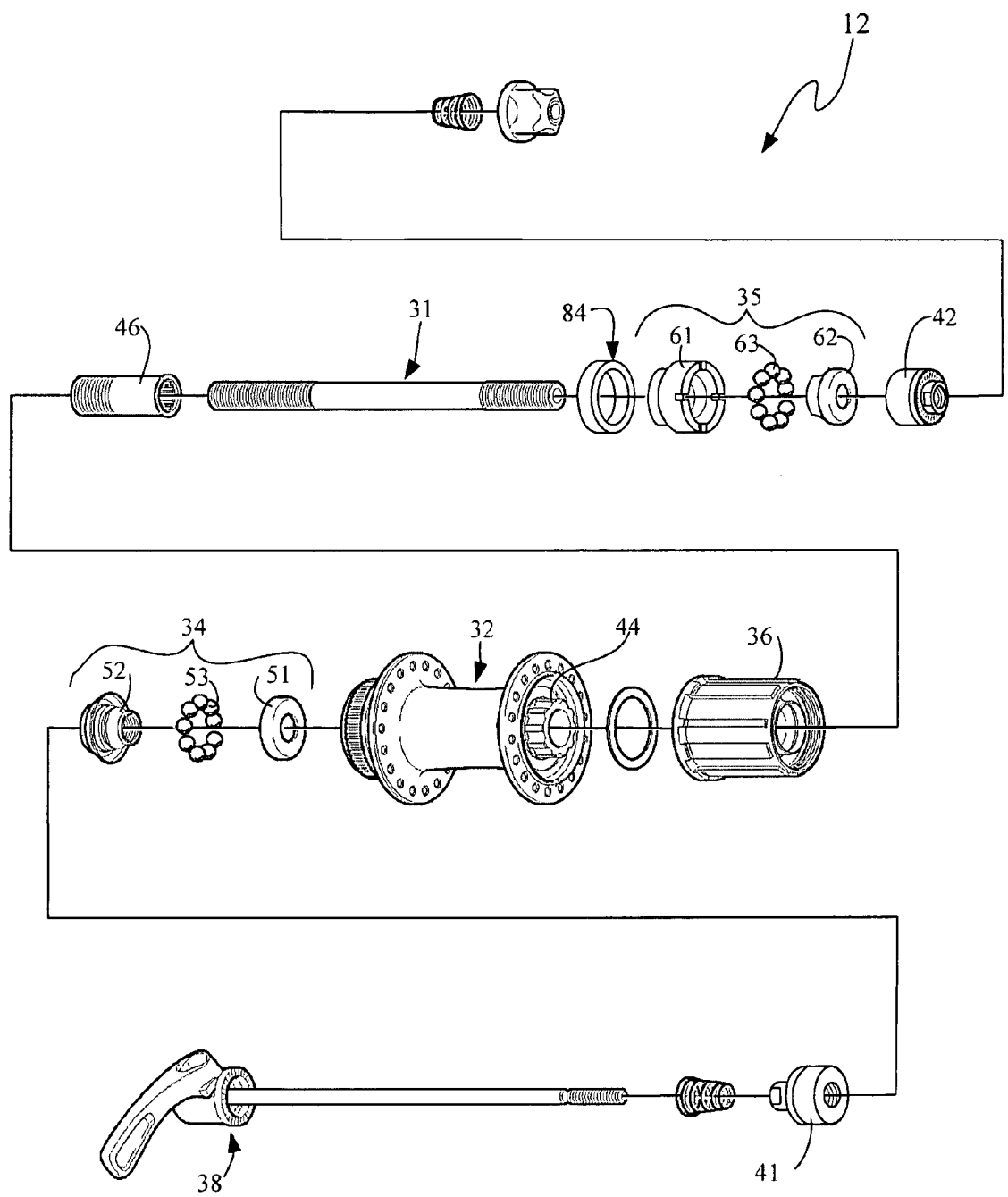
FIG. 3 is an exploded elevational view of the bicycle hub illustrated in FIGS. 1 and 2, with selected parts not shown.

Referring now to FIG. 2, the rear hub 12 basically includes a hub axle 31, a hub shell 32, a pair of hub axle bearings 34 and 35 and a freewheel 36 for receiving the rear sprockets 28. As seen in FIG. 3, the hub axle 31 includes a quick release device 38 for attaching the rear hub 12 to the bicycle frame 16. Accordingly, the hub axle 31 is fixed to the bicycle frame 16 by the quick release device 38 with the hub shell 32 and the freewheel 36 being rotatably mounted on the hub axle 31 by the hub axle bearings 34 and 35. The hub axle bearings 34 and 35 are secured to opposite ends of the hub shell 32 to rotatably support the hub shell 32 and the freewheel 36 on the hub axle 31. The hub axle bearings 34 and 35 are explained in more detail below. Also as explained below, the freewheel 36 limits rotation of the hub shell 32 to one rotational direction relative to the hub axle 31.

As best seen in FIGS. 2 and 3, the hub axle 31 is a tubular member that basically has a first axle end 31a that includes a first set of threads and a second axle end 31b that includes a second set of threads. The hub axle bearings 34 and 35 are threaded onto the first and second axle ends 31a and 31b of the hub axle 31 to fixedly secure the hub axle bearings 34 and 35 thereto. The hub axle 31 is preferably integrally formed as a one-piece, unitary member from a suitable hard, rigid material such as steel, aluminum, stainless steel or titanium.

Since the hub axle 31 is larger than an average hub axle, the hub axle 31 is also preferably provided with a first fixing nut 41 and a second fixing nut 42 that are threaded onto the first and second axle ends 31a and 31b of the hub axle 31. These fixing nuts 41 and 42 lock the hub axle bearings 34 and 35 on the hub axle 31. These fixing nuts 41 and 42 having cylindrical portions 41a and 42a that form a pair of frame mounting members for the hub axle 31. The diameters of the cylindrical portions 41a and 42a are smaller than the diameter of the hub axle 31. Thus, the fixing nuts 41 and 42 can be considered end parts of the hub axle 31. The fixing nuts 41 and 42 are threaded onto the first and second axle ends 31a and 31b of the hub axle 31 to apply an axial force to the first and second hub axle ball bearings 34 and 35.

The hub shell 32 will now be briefly described. Preferably, the hub shell 32 is preferably formed as a one-piece, unitary member. It will be apparent to those skilled in the art from this disclosure that the hub shell 32 can be constructed of any substantially rigid material, such as those materials, which are known to be used in the bicycle field. For example, the hub shell 32 can be constructed of any suitable metallic material, such as plated steel, stainless steel, aluminum, magnesium or titanium, as well as other non-metallic materials, such as carbon fiber composite, ceramic or plastic. Of course, the hub shell 32 could be constructed of several pieces of various different materials as need and/or desired.

The hub shell 32 has a first shell end 32a and a second shell end 32b with a center tubular portion 32c located therebetween. The first and second hub shell ends 32a and 32b are integral formed with the center tubular portion 32c as a one-piece, unitary member. The hub shell 32 is a tubular member having an inner tubular surface forming a central interior passage extending between the first and second shell ends 32a and 32b. The hub axle 31 is disposed within the central interior passage of the hub shell 32. The first bearing 34 rotatably supports the first shell end 32a of the hub shell 32 on the hub axle 31, while the second bearing 35 rotatably supports the second shell end 32b of the hub shell 32 and the freewheel 36 on the hub axle 31.

The first shell end 32a has a first spoke attachment portion or flange 32d for attaching spokes 18 and a brake rotor attachment portion 32e for a disc brake rotor (not shown). The second shell end 32b has a second spoke attachment portion or flange 32f for attaching spokes 18. The first and second spoke flanges 32d and 32f are preferably annular members with a plurality of first spoke holes that are equally spaced apart about the imaginary circle that is centered on the axis. The spoke holes are arranged to receiving the bent ends of the spokes 18. The interior passage of the first shell end 32a is configured and arranged to frictionally engage an outer peripheral part of the first bearing 34. The interior passage of the second shell end 32b is configured and arranged to fixedly receive a part of the freewheel 36.

The second shell end 32b of the hub shell 32 is non-rotatably connected to a part of the freewheel 36 by a splined shaft 44. The splined shaft 44 engages internal splines of the second shell end 32b of the hub shell 32 and a part of the freewheel 36 as explained below. The freewheel 36 is fixedly coupled to the second shell end 32b of the hub shell 32 by a freewheel body fixing bolt 46. The freewheel body fixing bolt 46 engages internal threads of the second shell end 32b of the hub shell 32.

As seen in FIG. 2, the first hub axle ball bearing 34 will now be discussed in greater detail. The first bearing 34 is disposed between the first axle end 31a of the hub axle 31 and the first shell end 32a of the hub shell 32 to rotatably support the first shell end 32a of the hub shell 32 on the first axle end 31a of the hub axle 31. The first bearing 34 is a cup and cone type of angular ball bearing. The first bearing 34 has high durability while being easy to maintain and simple to adjust. The first bearing 34 basically includes a first outer race or cup 51, a first inner race or cone 52, and a plurality of first rolling members or balls 53. The first bearing 34 has an angular contact axis $A_1$ that represent a line of force extending between the outer annular bearing surface of the cup 51 and the inner annular bearing surface of the cone 52. The cup 51 is frictionally coupled to the interior surface of the first shell end 32a of the hub shell 32. The cone 52 is threadedly mounted on the first axle end 31a of the hub axle 31. The balls 53 are disposed between the cup 51 and the cone 52 such that the cup 51 rotates with the hub shell 32 and the cone 52 rotates with the hub axle 31. Also various dust covers are used to protect the first bearing 34 as illustrated and/or needed.

Figure 4:
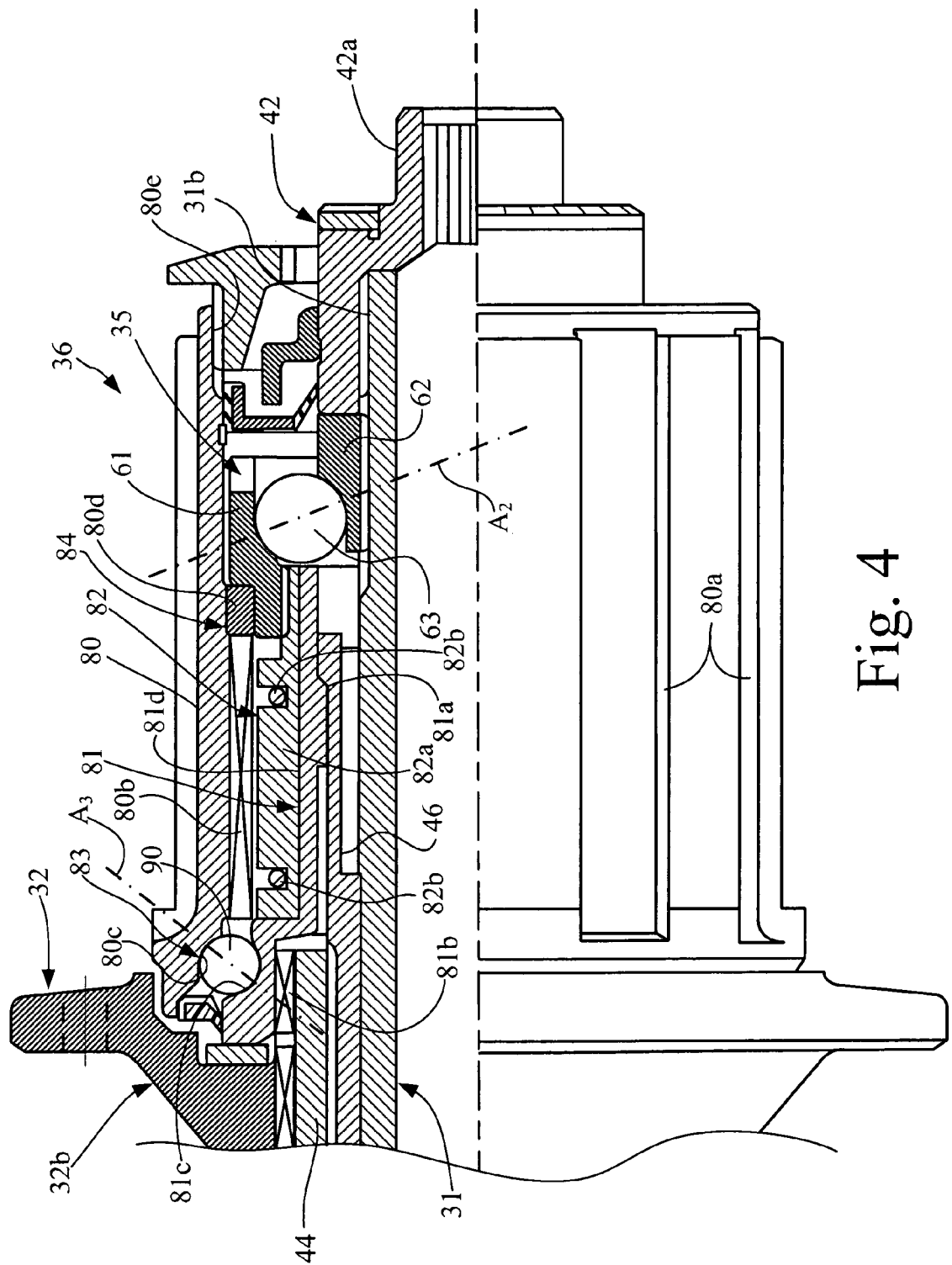
FIG. 4 is an enlarged partial elevational view of the freewheel portion of the bicycle hub illustrated in FIGS. 1–3, with the top half shown in cross-section, in accordance with the present invention.

Still referring to FIGS. 2 and 4, the second hub axle ball bearing 35 will now be discussed in greater detail. The second bearing 35 is disposed between the second axle end 31b of the hub axle 31 and the freewheel 36 to rotatably support the second shell end 32b of the hub shell 32 and the freewheel 36 on the second axle end 31b of the hub axle 31. The second bearing 35 is a cup and cone type of angular ball bearing. The second bearing 35 has high durability while being easy to maintain and simple to adjust. The second bearing 35 basically includes a second outer race or cup 61, a second inner race or cone 62, and a plurality of second rolling members or balls 63. The second bearing 35 has an angular contact axis $A_2$ that represent a line of force extending between the outer annular bearing surface of the cup 61 and the inner annular bearing surface of the cone 62. The cup 61 is fixedly coupled to an interior part of the freewheel 36 as explained below. The cone 62 is threadedly mounted on the second axle end 31b of the hub axle 31. The balls 63 are disposed between the cup 61 and the cone 62. Thus, the cup 61 rotates with the hub shell 32 and the freewheel 36, while the cone 62 rotates with the hub axle 31.

Figure 5:
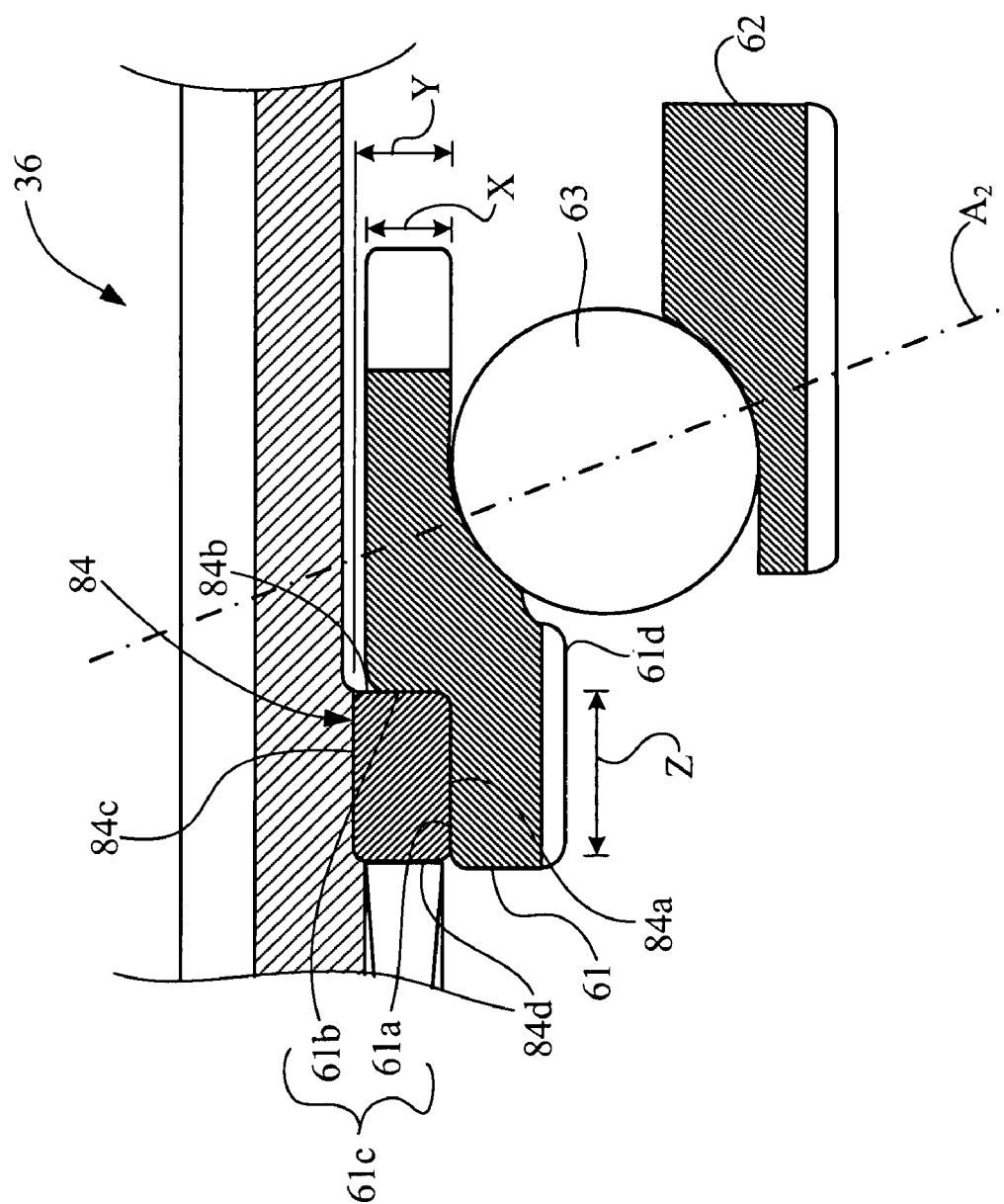
FIG. 5 is an enlarged simplified cross sectional view of the outer freewheel slide bearing of the bicycle hub illustrated in FIGS. 1–4 in accordance with the present invention.

As seen in FIG. 5, the outer race or cup 61 of the second hub axle ball bearing 35 has a circumferential slide-surface 61a and a radial slide-surface 61b that defines an annular notch 61c. The annular notch 61c slidably supports a first part of the freewheel 36, as discussed below. The cup 61 of the second hub axle ball bearing 35 also has a set of internal threads 61d that fixedly secures the cup 61 to a second part of the freewheel 36, as discussed below.

Turning back now to FIGS. 3 and 4, the freewheel 36 will now be discussed in greater detail. The freewheel 36 is operatively coupled between the second axle end 31b of the hub axle 31 and the second end 32b of the hub shell 32. More specifically, the freewheel 36 is coaxially mounted on the second axle end 31b of the hub axle 31 and fixed to the second end 32b of the hub shell 32 by the freewheel body fixing bolt 46. The second bearing 35 rotatably supports an outer end of the freewheel 36 to the second axle end 31b of the hub axle 31.

The freewheel 36 basically includes of a driving cylinder or drive body 80, a driven member or cylinder 81, and a unidirectional rotation transmission mechanism 82. The freewheel 36 also includes various dust covers as illustrated and/or needed. The drive body 80 is rotatably supported on the driven cylinder 81 by an inner freewheel ball bearing 83 and an outer freewheel slide bearing 84. However, the unidirectional rotation transmission mechanism 82 is a one-way clutch mechanism that limits relative rotation of the drive body 80 relative to the driven cylinder 81 to one rotational direction. In other words, the drive body 80 is operatively coupled to the driven cylinder 81 by the unidirectional rotation transmission mechanism 82 (one-way clutch mechanism), which limits rotation of the hub shell 32 relative to the hub axle 31 to one rotational direction. The basic operation of the freewheel 36 is relatively conventional, and thus, will not be discussed or illustrated in detail herein.

The drive body 80 is a tubular member having an outer peripheral surface with a plurality of axially extending splines 80a and an inner peripheral surface with a set of serrated teeth 80b that forms a first part of the unidirectional rotation transmission mechanism 82. The splines 80a of the drive body 80 non-rotatably couple the sprockets 28 to the outer peripheral surface of the drive body 80. Thus, the sprockets 28 are mounted to the drive body 80 for transmitting torque to the hub shell 32 via the unidirectional rotation transmission mechanism 82 and the driven cylinder 81. In other words, rotation of the sprockets 28 results in rotation of the drive body 80 which in turn rotates the driven cylinder 81 and the hub shell 32 via the unidirectional rotation transmission mechanism 82.

The inner peripheral surface of the drive body 80 also has a first inner annular bearing surface 80c, a first outer annular bearing surface 80d and a set of internal threads 80e. The first inner annular bearing surface 80c is located at an inner end of the drive body 80. The first outer annular bearing surface 80d is located adjacent an outer end of the serrated teeth 80b. The internal threads 80e are located at an outer end of the drive body 80. Thus, the first inner annular bearing surface 80c is disposed adjacent the second end 32b of the hub shell 32, and forms a first part of the inner freewheel ball bearing 83. The first outer annular bearing surface 80d is disposed in a more central location of the drive body 80, and forms a first part of the outer freewheel slide bearing 84.

The driven cylinder 81 has an inner peripheral surface with an axially facing abutment surface 81a and a set of internal splines 81b. The freewheel body fixing bolt 46 abuts against the axially facing abutment surface formed on the driven cylinder 81 to secure the freewheel 36 to the second end 32b of the hub shell 32. The splined shaft 44 engages internal splines 81b on the driven cylinder 81 so that the second shell end 32b of the hub shell 32 is non-rotatably connected to the driven cylinder 81. In other words, the driven member 81 is fixed to the second shell end 32b of the hub shell 32 to rotate therewith.

The driven cylinder 81 has an outer peripheral surface with a second inner annular bearing surface 81c and a cylindrical clutch mounting surface 81d. The second inner annular bearing surface 81c is disposed adjacent the second end 32b of the hub shell 32, and forms a second part of the inner freewheel ball bearing 83. The cylindrical clutch mounting surface 81d supports part of the unidirectional rotation transmission mechanism 82.

The unidirectional rotation transmission mechanism 82 is partially formed on the drive body 80 (i.e., the serrated teeth 80b of the drive body 80) and partially formed on the driven cylinder 81 (i.e., a pawl mounting member 82a with a plurality of transmission pawls). The pawl mounting member 82a is a cylindrical element that is frictionally retained on the cylindrical clutch mounting surface 81d of the driven cylinder 81. The transmission pawls (not shown) are movably mounted to the pawl mounting member 82a to selectively engage the serrated teeth 80b of the drive body 80 in a conventional manner. In particular, the transmission pawls are moved outwardly in a radial direction to mesh with the serrated teeth 80b due to biasing force exerted by biasing element such as springs 82b secured to the pawl mounting member 82a or due to centrifugal forces occurring from the positive rotation of the drive body 80. This engagement of the transmission pawls 80b with the serrated teeth 82a transmits the driving power or torque from the freewheel 36 to the hub shell 32 that is splined engaged with the driven cylinder 81. Thus, the serrated teeth 80b form a first part of a one-way clutch mechanism, while the pawl mounting member 82a with the transmission pawls form a second part of the a one-way clutch mechanism. Since the unidirectional rotation transmission mechanism 82 is relatively conventional, it will not be discussed or illustrated in further detail herein.

The inner freewheel ball bearing 83 is disposed axially inward of the outer freewheel slide bearing 84 such that the inner freewheel ball bearing 83 rotatably supports an inner end of the drive body 80 and the outer freewheel slide bearing 84 rotatably supports an outer end of the drive body 80. The outer freewheel slide bearing 84 is positioned laterally inwardly from the angular contact axis $A_2$ of the second hub axle ball bearing 35. The outer freewheel slide bearing 84 contacts an axially facing side surface of the serrated teeth 80b of the drive body 80.

The inner freewheel ball bearing 83 is disposed between the driven member 81 and the drive body 80 to rotatably support an inner end of the drive body 80 on the driven member 81. In particular, the inner freewheel ball bearing 83 is an angular ball bearing that includes the first inner annular bearing surface 80c of the drive body 80, the second inner annular bearing surface 81c of the driven member 81, and a plurality of rolling members or balls 90. The balls 90 are disposed between the first inner annular bearing surface 80c and the second inner annular bearing surface 81c. The inner freewheel ball bearing 83 has an angular contact axis $A_3$ that represent a line of force extending between the first inner annular bearing surface 80c and the second inner annular bearing surface 81c.

The outer freewheel slide bearing 84 is disposed between the drive body 80 and the driven member 81 to rotatably support an outer end of the drive body 80 on the driven member 81. In particular, the outer freewheel slide bearing 84 is a slide bearing that fixedly engages the first outer annular bearing surface 80d of the drive body 80 and slidably engages that the annular notch 61c of the outer race or cup 61 of the second hub axle ball bearing 35. In other words, the outer freewheel slide bearing 84 non-slidably engages the first outer annular bearing surface 80d of the drive body 80, and slidably engages against the outer race or cup 61 of the second hub axle ball bearing 35. The outer freewheel slide bearing 84 is formed of a metal, a resin or any other metal that can provide a smooth sliding surface having a relatively low coefficient of friction.

Referring now to FIG. 5, the outer freewheel slide bearing 84 has two sliding surfaces (i.e., a circumferential slide-surface 84a and a radial slide-surface 84b) and two stationary contact surfaces (i.e., a circumferential contact surface 84c and a radial contact surface 84d). The circumferential slide-surface 84a is slidably engaged with the circumferential slide-surface 61a of the outer race or cup 61 of the second hub axle ball bearing 35. The radial slide-surface 84b is slidably engaged with the radial slide-surface 61b of the cup 61. The combination of the angular-type inner freewheel ball bearing 83 with the outer freewheel slide bearing 84 having the circumferential slide-surface 84a and the radial slide-surface 84b increases the durability of the freewheel 36 against loads exerted during use of the rear bicycle hub 12. The outer freewheel slide bearing 84 is press fitted into the drive body 80 with the circumferential contact surface 84c frictionally contacting the first outer annular bearing surface 80d of the drive body 80 and the radial contact surface 84d of the outer freewheel slide bearing 84 frictionally contacts an axially facing side surface of the serrated teeth 80b of the drive body 80. Such arrangement effectively contributes to achieve easy assembly of the rear bicycle hub 12.

The radial slide-surface 61b of the cup 61 has a radial length "X" that contacts the radial slide-surface 84b of the outer freewheel slide bearing 84. The radial slide-surface 84b of the outer freewheel slide bearing 84 has a radial length "Y" that is larger than the radial length "X" of the radial slide-surface 61b of the cup 61 of the second hub axle ball bearing 35. Preferably, the axial length "X" of the radial slide-surface 61b of the cup 61 is at least equal to half of the radial length "Y" of the radial slide-surface 84b of the outer freewheel slide bearing 84 in order to increase durability of the outer freewheel slide bearing 84 against load exerted in an axial direction of the freewheel 36.

The circumferential slide-surface 84a of the outer freewheel slide bearing 84 has an axial length "Z" that is generally equal to the circumferential slide-surface 61a of the cup 61. Thus, the axial length "Z" represents the amount of circumferential surface contact length between the circumferential slide-surface 61a of the cup 61 and the circumferential slide-surface 84a of the outer freewheel slide bearing 84. In a preferred embodiment, the axial length "Z" (amount of circumferential surface contact) is larger than the radial length "X" (amount of radial surface contact). The ratio of the axial length "Z" (amount of circumferential surface contact) to the radial length "X" (amount of radial surface contact) preferably lies in a range between "3 to 1" and "2 to 1". Moreover, the axial length "Z" of the circumferential slide-surface 84a of the outer freewheel slide bearing 84 is preferably larger than or equal to the radial length "Y" of the radial slide-surface 84b of the outer freewheel slide bearing 84. The ratio of the axial length "Z" of the circumferential slide-surface 84a of the outer freewheel slide bearing 84 to the radial length "Y" of the radial slide-surface 84b of the outer freewheel slide bearing 84 preferably lies in a range between "1 to 1" and "5 to 1". The ratio of the axial length "Z" to the radial length "Y" is more preferably about "2 to 1". This is because radially exerted load is generally larger than axially exerted load during use.

As used herein to describe the present invention, the following directional terms "forward, rearward, above, downward, vertical, horizontal, below and transverse" as well as any other similar directional terms refer to those directions relative to a bicycle equipped with the present invention. Accordingly, these terms, as utilized to describe the present invention should be interpreted relative to a bicycle equipped with the present invention. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle hub comprising:
   a hub axle including a first axle end and a second axle end; and
   a hub shell having a first shell end and a second shell end with an inner tubular surface forming a central passage extending between the first and second shell ends, the hub axle being disposed within the central passage of the hub shell such that the hub shell is rotatably supported on the hub axle;
   a freewheel operatively mounted between the second axle end of the hub axle and the second shell end of the hub shell, the freewheel including
      a driven member fixed to the second shell end of the hub shell to rotate therewith,
      a drive body operatively coupled to the driven member by a one-way clutch mechanism,
      an inner freewheel ball bearing disposed between the driven member and the drive body to rotatably support an inner end of the drive body on the driven member, and
      an outer freewheel slide bearing disposed between the driven member and the drive body to rotatably support an outer end of the drive body on the driven member;
   a first hub axle ball bearing disposed between the first axle end of the hub axle and the first shell end of the hub shell to rotatably support the first shell end of the hub shell on the first axle end of the hub axle; and
   a second hub axle ball bearing disposed between the second axle end of the hub axle and one of the driven member and the second shell end of the hub shell to rotatably support the driven member and the second shell end of the hub shell on the second axle end of the hub axle.

2. The bicycle hub according to claim 1, wherein the inner freewheel ball bearing is an angular ball bearing.

3. The bicycle hub according to claim 1, wherein the outer freewheel slide bearing non-slidably engages the drive body of the freewheel, and slidably engages against an outer race of the second hub axle ball bearing.

4. The bicycle hub according to claim 3, wherein the outer freewheel slide bearing has a circumferential slide-surface slidably engaged with a circumferential slide-surface of the outer race of the second hub axle ball bearing, and a radial slide-surface slidably engaged with a radial slide-surface of the outer race of the second hub axle ball bearing.

5. The bicycle hub according to claim 4, wherein the radial slide-surface of the outer freewheel slide bearing has a radial length "Y" that is larger than a radial length "X" of the radial slide-surface of the outer race of the second hub axle ball bearing.

6. The bicycle hub according to claim 4, wherein the radial slide-surface of the outer race of the second hub axle ball bearing has a radial length "X" that is at least-equal to half of a radial length "Y" of the radial slide-surface of the outer freewheel slide bearing.

7. The bicycle hub according to claim 4, wherein the circumferential slide-surfaces of the outer freewheel slide bearing and the outer race of the second hub axle ball bearing contact each other along a circumferential contact length "Z" that is larger than a radial length "X" of the radial slide-surface of the outer race of the second hub axle ball bearing.

8. The bicycle hub according to claim 7, wherein the circumferential contact length "Z" to the length "X" of the radial slide-surface of the outer race lies in a range between "3 to 1" and "2 to 1".

9. The bicycle hub according to claim 4, wherein the circumferential slide-surfaces of the outer freewheel slide bearing and the outer race of the second hub axle ball bearing contact each other along a circumferential contact length "Z" that is larger than or equal to a radial length "Y" of the radial slide-surface of the outer freewheel slide bearing.

10. The bicycle hub according to claim 9, wherein the circumferential contact length "Z" to the length "Y" of the radial slide-surface of the outer freewheel slide bearing lies in a range between "1 to 1" and "5 to 1".

11. The bicycle hub according to claim 9, wherein the circumferential contact length "Z" to the length "Y" of the radial slide-surface of the outer freewheel slide bearing is about "2 to 1".

12. The bicycle hub according to claim 3, wherein the outer freewheel slide bearing is positioned laterally inwardly from an angular contact axis of the second hub axle ball bearing.

13. The bicycle hub according to claim 12, wherein the outer freewheel slide bearing contacts an axially facing side surface of the drive body.

14. The bicycle hub according to claim 1, wherein the first and second axle ends of the hub axle include frame mounting members with cylindrical portions that have diameters that are smaller the a diameter of a portion of the hub axle located in the freewheel beneath the inner freewheel ball bearing and the outer freewheel slide bearing.

15. The bicycle hub according to claim 14, wherein the frame mounting members are threaded onto the first and second axle ends of the hub axle to apply an axial force to the first and second hub axle ball bearings.

* * * * *